United States Patent Office 2,735,018
Patented Feb. 14, 1956

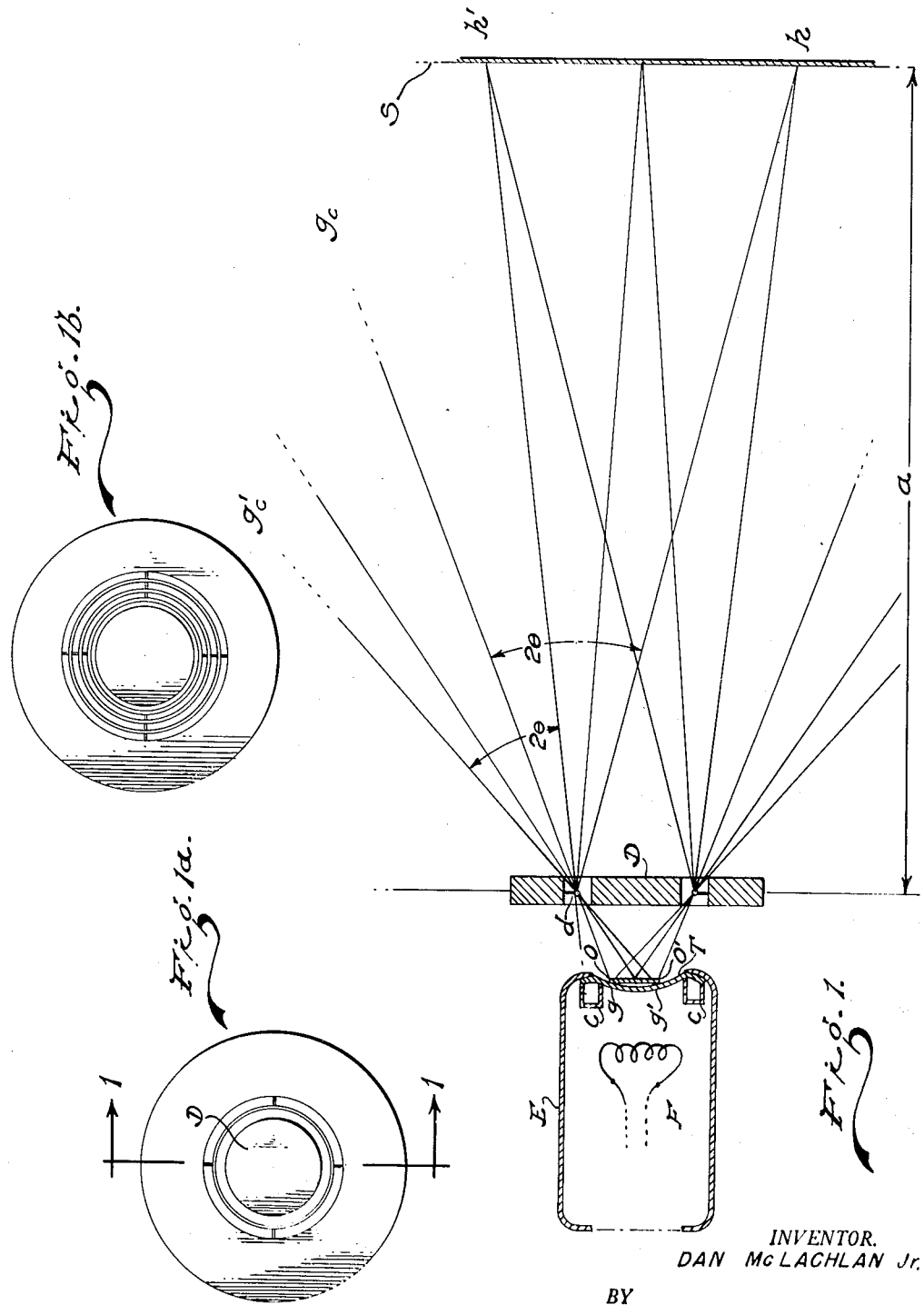

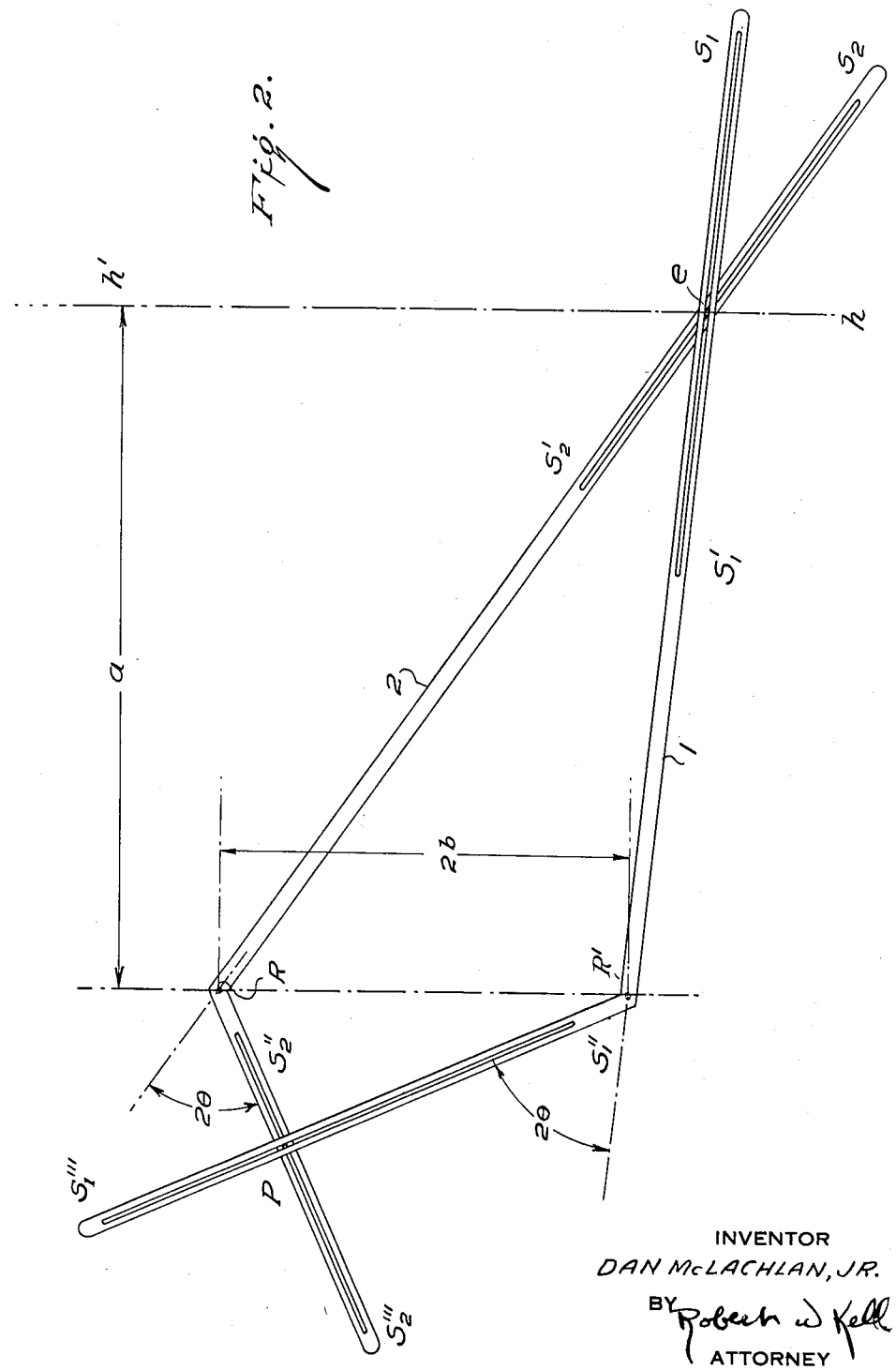

2,735,018

X-RAY MICROSCOPE

Dan McLachlan, Jr., Salt Lake City, Utah, assignor to American Cyanamid Company, New York, N. Y., a corporation of Maine Application February 19, 1953, Serial No. 337,711

4 Claims. (Cl. 250—53)

This invention relates to a method and device for producing enlarged images of materials by means of X-ray diffraction.

Various forms of radiation have been used in optical systems to produce enlarged images. Visible and ultraviolet light is employed in the well-known microscopes and other optical systems, and electron streams have been used in electron microscopes and similar devices.

In the visible, ultraviolet, and infrared range of radiation it is possible to use optical systems in which either refracting lenses or reflecting mirrors are used for image formation, because in this range of radiation there are available materials having widely different transmission rates (indices of refraction) for the energy in question and also materials which are so opaque to the radiation that satisfactory mirror surfaces can be prepared on which a large portion of the radiant energy can be reflected.

Streams of electrons can be converged and diverged by electrical means to produce effects similar to refractive lenses in the visible light range. However, X-rays have not been hitherto readily available for use as a radiation for enlarged image formation. The reason for this failure lies in the fact that there are no sufficiently great differences in speeds of propagation of X-rays in different substances so that refracting systems are not feasible. At the same time, the penetration of X-rays is so great that the problem of an X-ray mirror has been insoluble except for a few special cases of substantially grazing incidence. X-rays being electromagnetic waves, of course, cannot readily be converged and diverged by magnetic or electrostatic lenses, as can be streams of electrons.

This leaves only one property of materials which can be considered in the design of X-ray image formers, namely, their ability to diffract. However, the use of crystals as diffracting elements is subject to a serious limitation which has made their use for image formation impractical. Suitable diffracting crystals can be bent, but they can be bent in only one direction, compound curvature setting up stresses which break the crystals when they are bent in a different direction. When bent in one direction to form a cylindrical surface, it is possible to use large crystals to effect convergence and divergence of X-rays by diffraction, but the rays are converged in only one dimension. In other words, the X-ray optical elements thus produced behave in a manner similar to cylindrical mirrors which permit forming enlarged images only of lines extending parallel to the axis of the cylinder and do not permit the formation of enlarged images of many different kinds with any satisfactory degree of definition.

The present invention utilizes the phenomenon of X-ray diffraction, but overcomes the difficulties encountered with the cylindrical diffractors referred to above, permitting convergence in an additional dimension which makes practical the formation of enlarged images of useful definition by X-ray diffraction.

The problem of making a diffracting surface which will be capable of converging X-rays presents a serious but not insoluble problem. The fact that it is not possible to bend large crystals in two directions may be overcome by using materials which have a microcrystalline surface. The random orientation of the crystals in such surfaces results in their behavior, under suitable circumstances, as if they formed a diffraction mirror. In other words, convergence and divergence of X-rays can be effected by diffraction in a manner to give a result similar to that obtained by the reflection of a longer wave length radiation, such as light.

The manner in which X-rays may be used to effect magnification of thin sections may be understood by reference to Figures 1 and 2 which illustrate different embodiments of my invention.

Fig. 1 shows the method of making enlarged images by the simplest means pertinent to this invention. Fig. 1a illustrates discs having a single wire therebetween and Fig. 1b illustrates discs having a plurality of wires therebetween. Fig. 2 illustrates a mechanical device helpful in designing the X-ray target. With reference to Fig. 1, enclosure E is a special X-ray tube housing inside of which is an ordinary filament F for generating electrons by thermal emission. The voltage between the filament and housing may be 5 kilovolts or as high as 40 kilovolts, depending upon the radiation desired and the materials used in the window and the discs (see below). The window T is unusual in that it plays a double role of both window and target. It is cooled by the passage of cooling liquid through the cooling jacket C.

The electrons generated by the filament F are brought against the target-window by the voltage difference existing between the filament and the target-window. The stoppage of the electrons by the window causes a generation of X-rays, both continuous and characteristic, over the planar area of the window.

The object O—O' to be enlarged is placed adjacent to the exterior surface of the window. The X-rays which emerge from the window will then pass through the sample or object, and the variation of X-ray intensity over the beam area is a function of the variation of opacity of the object to X-rays.

The disc D in Fig. 1 is a round flat plate, relatively opaque to X-rays, surrounded by a second concentric disk. A circular wire is positioned in the annular opening between the two disks and held in place by small wire supports to the outer concentric disk.

If the ray originating from the point $g$, on the object, strikes the wire at $d$, a portion of the ray will continue in the direction of $g_c$ and a portion will be diffracted or bent in the direction $h$, where it strikes the film or plate. The angle between the lines $dg_c$ and $dh$ is $2\theta$ and is characteristic of the material chosen for the wire. The ray originating from the point $g'$ on the object and which strikes the point $d$, must have a portion which continues in the direction $g'_c$ and the diffracted portion must be bent the same angle $2\theta$ as was the ray originating from $g$, but the bent ray from $g'$ strikes the film at $h'$. Thus the object $gg'$ is enlarged to $hh'$ on the plate S. All points around the circular wire behave in a manner identical to that described for the behavior at the point $d$.

It is apparent from Fig. 1 that to obtain sharp focusing of the image on a flat screen, the surface of both the window and the object must be curved. This window shape is defined by the equation:

$$y=b+x\left[\frac{\left(q^2+\frac{qkx}{b}\right)^{1/2}+kT^{1/2}\left(T+\frac{x}{b}\right)^{1/2}}{qT^{1/2}\left(T+\frac{x}{b}\right)^{1/2}+T\left(q^2+\frac{qkx}{b}\right)^{1/2}}\right] \quad (1)$$

wherein $b$ is the radius of the wire ring $d$.
$a$ is the distance from the center of the object to the center of the screen.
$T = \tan 2\theta$
$k = b - a \tan 2\theta$
$q = a + b \tan 2\theta$, and
$x$ and $y$ are the coordinates on the $x$ and $y$ axes, respectively.

Inasmuch as the above equation is involved and difficult to handle, it will be found more convenient to draw the curve of the window mechanically with the aid of the apparatus illustrated in Fig. 2 wherein the letters $a$, $b$, and $hh'$ have the same meaning as in Fig. 1.

The apparatus of Fig. 2 consists of two flat pieces of metal, each bent at R and R' to the angle $2\theta$. The pivots at R and R' are fixed. At the ends of arm 1 are the slots $S_1S_1'$ and $S_1''S_1'''$. At the ends of arm 2 are the slots $S_2S_2'$ and $S_2''S_2'''$. A line $hh'$ is drawn parallel to the line RR' at distance $a$. The distance between the stationary pivots R and R' is $2b$. A pointer fits snugly into the slots $S_1S_1'$, $S_2S_2'$ at position $e$. As the pointer $e$ is forced to travel over the straight line $hh'$ the pencil at P is forced by the slots $S_1''S_1'''$, $S_2''S_2'''$ to trace a curve designating the shape of the window.

The magnification of my microscope M is given by the equation:

$$M = \frac{b(q-kT) \pm \sqrt{b^2(q-kT)^2 + 4y^2kTq}}{2y^2T} \quad (2)$$

in which $b$, $a$, $T$, $k$, $q$ and $y$ are defined as in Equation 1 above. Thus, while the magnification is not a constant, the variation of the magnification $$\frac{dm}{dy}$$

is zero at the origin and increases gradually in a negative sense. This means that the magnification is practically constant near the center and decreases to zero as one approaches $y=b$. It is desirable therefore, that the size of the object and window be small in relation to $b$.

The angle $2\theta$ is the angle of strongest diffraction from the material chosen for the wire. The design of the circular diffracting wire is chiefly dependent on three variables: the spacing of the diffracting crystal planes, the wave length of the X-radiation used, and the desired angle of divergence of the diffracted X-rays from the surface of the wire. If copper K$\alpha$ radiation (CuK$\alpha$=1.5418 A.) is used and brass is the diffracting material with the 2.08 A. spaced planes being the diffracting planes, the Bragg angle $2\theta$ (as calculated from the equation: $n\lambda = 2d \sin \theta$) will be about 43.5°. The radius of the circular wire is related to this angle $2\theta$ the distance $a$ and the size of the window T.

Thus I have demonstrated that a circular wire may be used for enlargement of objects using X-radiation. The variation of opacity of the object over its area determines the variation of density over the area of the photograph and the accuracy of the instrument is now determined by the accuracy to which the wire can be formed into a perfect circle and the fineness of the wire and the size and shape of the window.

It will be apparent to one skilled in the art that my apparatus for making enlarged images could be improved by a combination and expansion of the principles developed above. When the area of the target window is small, additional concentric wires may be added, each made of a different material and possessed with its own characteristic (strongest diffraction) angle $2\theta$. This variation is shown in Figure 1$b$. Unfortunately, there is no general equation that will define a series of concentric wires all of which will cooperate to focus the image on the plate. The shape of each additional wire must be calculated separately and corrected for aberration by the method used in optics to determine refraction zones.

The method and apparatus of the present invention should not be thought of as producing enormous magnifications. This is not the purpose of the invention, and the precision of surface and thickness of diffracting wires set a limit as does the length of exposure. In general, the invention is much more useful for magnifications of about 50 diameters than it is for greater degrees of magnification.

The duration of exposure of the X-ray film is a matter that requires consideration. While superficially the overall output of the device and method of the present invention may look somewhat the same as that obtained with refracting optics and ordinary light, the energy efficiency with X-rays is very much lower. X-ray diffraction is a relatively inefficient process and only a small portion of the diffracted rays from any point in the diffracting layer is utilized. The exposure may be decreased, however, by increasing the number of concentric wires, up to a certain limit.

A most important factor is the nature of a diffracting surface. Since convergence results from a diffraction phenomenon and not from specular reflection, the X-rays penetrate through the surface of the wire ring and are diffracted at different levels in the surface to produce parallel beams. There will be a blurring or lack of definition due to the broadening effect of a series of parallel beams diffracted at different levels in the surface. This lack of definition may be visualized as a broadening of sharp lines or the formation of halos about points in the enlarged image. This problem requires a compromise which is determined by the magnification to be used and hence by the resolution required. The thickness of the diffracting layer, therefore, should be of the same order of magnitude as the resolution, that is, a 50-diameter magnification would require a layer of the order of magnitude of five microns.

Another solution to this problem is to use a wire of microcrystalline metal of very high absorption, such as lead. Here, the beams diffracted from lower levels suffer so much energy absorption that the halos resulting are too dim to interfere seriously with the resolution of an image on a suitable film. Lead is not a convenient structural material because of its lack of rigidity, but lead supported by more rigid materials, such as steel, glass and the like, may be used.

The loss in sharpness resulting from diffraction within a relatively thick diffracting layer on the rings, discussed above, would indicate the desirability of using very soft X-rays which penetrate very poorly. The choice of an aluminum target will produce X-rays having a wave length of about 10 A. However, when the radiation is too soft, other complications are encountered as it is difficult to obtain powerful diffraction in sharp lines. Thus, for example, X-radiation of a wave length of 10 A. might require diffracting substances having an interplanar spacing of 16 A., which is found mainly in crystalline organic compounds. I prefer to use metallic diffractors. Radiation of 10 A. is a desirable wave length, although the invention is still operative with even softer X-rays. As a result of the difficulties encountered when too soft or too hard X-radiation is used, the practical operating range is X-rays of 1 to 10 A. Where the nature of the specimen permits, the best overall combination of resolution and intensity is a monochromatic radiation of wave length between 3 and 5 A.

It should be noted that the wave length of the X-radiation is not independent of the nature of the specimen to be examined because certain materials have very high absorption characteristics for particular wave lengths due to fluorescence phenomena. For example, copper radiation (K$\alpha$=1.5418 A.) is not suitable for the examination of iron samples because of excessive scattering of new radiation. It is therefore necessary that the X-ray source emit rays which have a suitable wave length for the material to be investigated, and this will also affect the material and diameter of the wire ring. In order to obtain strong diffraction of the proper radiation, these three factors must be taken into consideration. It is of course possible to use a comparatively few diffraction systems to cover the most frequently used X-ray sources and these will permit examination of a wide variety of samples. The quality of the image may be improved by introducing a shielding system to cut out undesirable diffraction that occurs at angles other than $2\theta$.

I claim:

1. As a new article of manufacture useful for the production of enlarged images by means of X-ray diffraction, in combination, an X-ray tube characterized by a target which functions both as a source of X-rays and as a window for X-ray transmission; planar concentric discs arranged to form at least one annular ring between the circumference of the internal disc and the inner edge of the external discs; said concentric discs being so positioned in a plane parallel to the surface of said target that X-rays emerging perpendicularly to the surface of said target at its center pass through the center of said concentric discs; a circle of wire positioned symmetrically in the annular ring between said concentric discs; said circle being of such radius that when an object is placed adjacent to the external surface of said target an enlarged image of said object is formed.

2. As a new article of manufacture useful for the production of enlarged images by means of X-ray diffraction, in combination, an X-ray tube characterized by a target which functions both as a source of X-rays and as a window for X-ray transmission; a planar concentric system comprising an internal disc surrounded by an annular wire and an external disc; and the external disc having a concentric circular opening of a diameter greater than the annular wire; said planar concentric system being so positioned in a plane parallel to the surface of said target that X-rays emerging perpendicularly to the surface of said target at its center pass through the center of said concentric system; said annular wire being of such diameter that when an object is placed on the external surface of said target an enlarged image of said object is formed.

3. A new article of manufacture according to claim 2 having more than one but less than six alternating annular wires and discs in said concentric system.

4. As a new article of manufacture useful for the production of enlarged images by means of X-ray diffraction, in combination, an X-ray tube characterized by a target which functions both as a source of X-rays and as a window for X-ray transmission; planar concentric rings arranged to form an annular space between the circumference of the internal ring and the inner edge of the external ring, said concentric rings being so positioned in a plane parallel to the surface of said target that the source of X-rays, center of said target, and center of said planar concentric rings are co-linear.

References Cited in the file of this patent

UNITED STATES PATENTS

| | | |
|---|---|---|
| 1,622,149 | St. John | Mar. 22, 1927 |
| 1,967,869 | Coolidge | July 24, 1934 |
| 1,993,058 | Hahn | Mar. 5, 1935 |
| 2,168,780 | Olshevsky | Aug. 8, 1939 |
| 2,440,640 | Marton | Apr. 27, 1948 |
| 2,500,948 | Kaiser | Mar. 21, 1950 |
| 2,617,942 | McLachlan, Jr. | Nov. 11, 1952 |
| 2,653,249 | Harker | Sept. 22, 1953 |
| 2,679,474 | Pajes | Mar. 25, 1954 |